US006903594B2

(12) United States Patent
Wells

(10) Patent No.: US 6,903,594 B2
(45) Date of Patent: Jun. 7, 2005

(54) CAPACITOR-FREE LEAKY INTEGRATOR

(75) Inventor: Richard B. Wells, Moscow, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 0 days.

(21) Appl. No.: 10/638,775

(22) Filed: Aug. 11, 2003

(65) Prior Publication Data

US 2004/0036522 A1 Feb. 26, 2004

Related U.S. Application Data

(60) Provisional application No. 60/403,481, filed on Aug. 13, 2002.

(51) Int. Cl.[7] .................................................. G06F 7/64

(52) U.S. Cl. ........................................ 327/336; 327/345

(58) Field of Search ................................ 327/336, 337, 327/341, 344, 345, 561, 562, 77, 80, 85, 87; 330/86, 110, 282

(56) References Cited

U.S. PATENT DOCUMENTS

| | | | | | |
|---|---|---|---|---|---|
| 4,400,637 | A | * | 8/1983 | Klar et al. | 327/336 |
| 4,710,726 | A | * | 12/1987 | Czarnul | 330/86 |
| 4,835,421 | A | * | 5/1989 | Khoury et al. | 327/103 |
| 4,849,708 | A | * | 7/1989 | Brehmer et al. | 330/110 |
| 6,018,262 | A | * | 1/2000 | Noro et al. | 327/328 |

* cited by examiner

*Primary Examiner*—Long Nguyen
(74) *Attorney, Agent, or Firm*—Ormiston & McKinney, PLLC

(57) ABSTRACT

A leaky integrator is formed from a capacitor-free, non-linear delay resistor having a parasitic capacitance and a capacitor-free amplifier. The amplifier utilizes utilize the parasitic capacitance of the delay resistor to provide differing time constants for the rising and falling edges of an output signal produced in response to a pulsed input signal.

11 Claims, 4 Drawing Sheets

1: output signal responding to a 0.25V, 2$\mu$S input signal, where VGR=1.0V
2: output signal responding to a 0.25V, 2$\mu$S input signal, where VGR=1.1V
3: output signal responding to a 0.25V, 2$\mu$S input signal, where VGR=1.2V
4: output signal responding to a 0.25V, 2$\mu$S input signal, where VGR=1.3V
5: output signal responding to a 0.25V, 2$\mu$S input signal, where VGR=1.4V

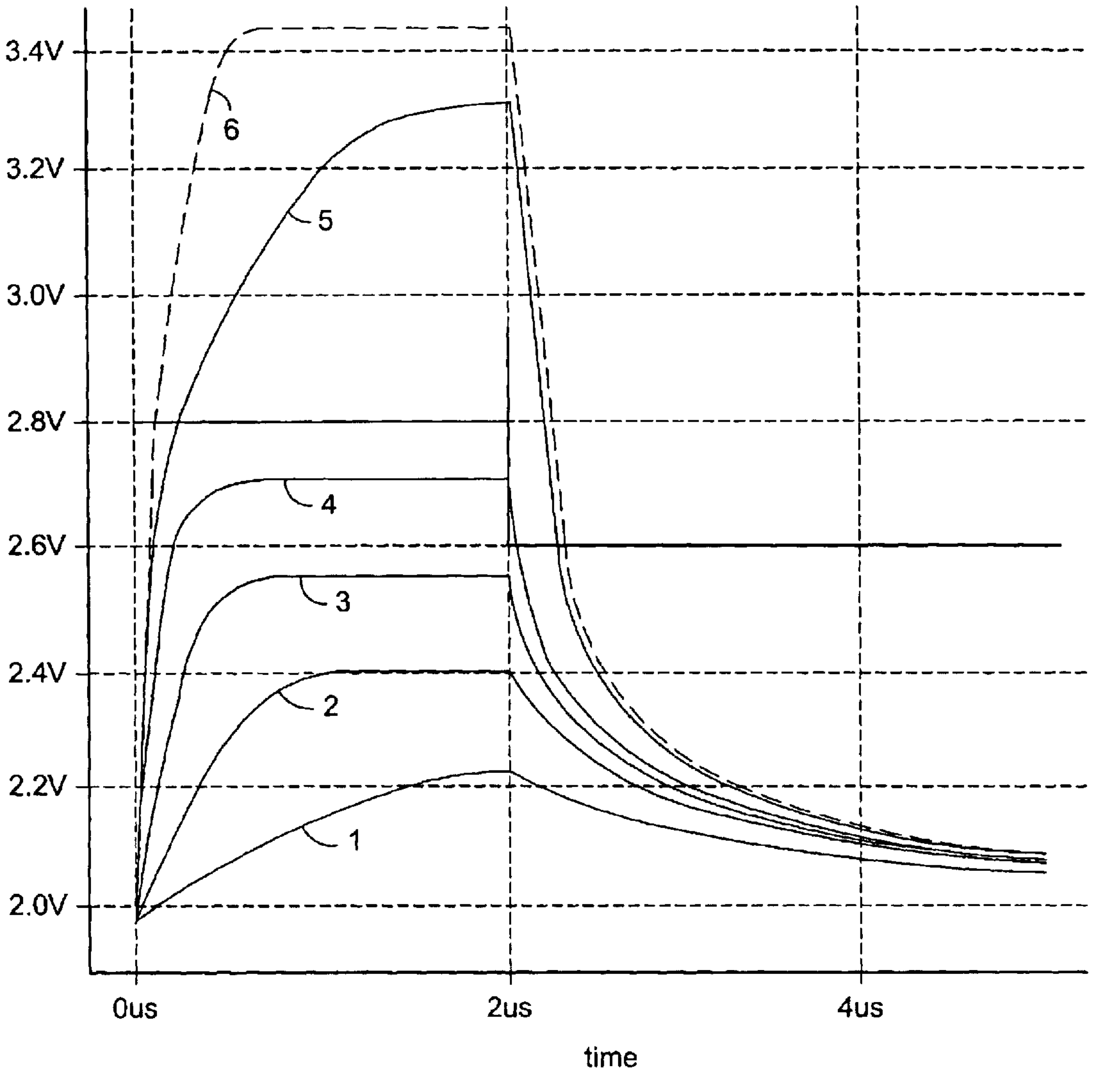

1: output signal responding to a 0.10V, 2μS square pulse input signal
2: output signal responding to a 0.15V, 2μS square pulse input signal
3: output signal responding to a 0.20V, 2μS square pulse input signal
4: output signal responding to a 0.25V, 2μS square pulse input signal
5: output signal responding to a 0.30V, 2μS square pulse input signal
6: output signal responding to a 0.35V, 2μS square pulse input signal

FIG. 3

CAPACITOR-FREE LEAKY INTEGRATOR

CROSS REFERENCE TO RELATED APPLICATION

This application claims subject matter disclosed in provisional patent application Ser. No. 60/403,481 filed Aug. 13, 2002, entitled Capacitor-Free Leaky Integrator.

FIELD OF THE INVENTION

The present invention generally relates to a leaky integrator, and, more specifically, to a capacitor-free leaky integrator capable of being used in an artificial neuron.

BACKGROUND

Artificial neural networks (ANN) are used in computing environments where mathematical algorithms cannot describe a problem to be solved. ANNs are often used for speech recognition, optical character recognition, image processing, and numerous other mathematically ill-posed computation and signal processing problems. ANNs are able to learn by example and, when receiving an unrecognized input signal, can generalize based upon past experiences.

A given ANN is made up, at least in part, of a number of interconnected artificial neuron circuits. The output signal of a given neuron is dependent upon a series of input signals received from a group of other artificial neurons or from sensor or transducer input devices. In the case of a pulse coded ANN, the output signal changes based upon factors like the delay between a pair of input signals. The output of an artificial neuron is often called its "activation." This "activation" ranges from no or very low activation to high-level activation. In a pulse-coded neuron the level of activation is measured in terms of the frequency and duration of output pulses which are called "action potentials" after the name given to the outputs of biological neurons.

The activation of a pulse-coded artificial neuron is typically based on a nonlinear spatial and temporal sum of its inputs. Spatial sum means the sum of all the inputs that are active at the same time. Temporal sum means that all the inputs are summed with a forgetting factor commonly referred to as a leaky integral. Leaky integrators are key subsystems in pulse-mode artificial neurons as they are responsible for spatially and temporally summing the input signals to determine the artificial neuron's activation.

A given pulse-mode artificial neural network will have dozens to hundreds of leaky integrators. Using conventional approaches, each leaky integrator circuit requires the use of one or more integrated capacitors. Compared to the size of other leaky integrator components, a capacitor is large and requires a substantial amount of space. For example a one picofarad capacitor requires on the order of 2000 square micrometers of space on an integrated circuit fabricated using a standard process. An integrated transistor, in contrast, may require less than ten square micrometers.

If the capacitors can be replaced with smaller components such as transistors, the size of a pulse-mode artificial neuron can be reduced. Moreover, conventional leaky integrators have fixed time constants. If the time constant can be adapted or altered, a pulse-mode artificial neuron could better mimic a biological neuron.

DESCRIPTION OF THE DRAWINGS

FIG. 3 is a graph illustrating variation of pulse responses as a function of input signal level of the circuit shown in FIG. 1.

DETAILED DESCRIPTION

Introduction

The leaky integrator is a key subsystem in pulse-mode artificial neurons. In most implementations reported to date the leaky integrator function has been implemented with the explicit use of integrated capacitors and with fixed time constants. More recently it has been noted that mimicking real biological systems is better accomplished if the integrator time constants are adaptable and if different time constants are realized for rising and failing edges of the circuit's pulse response.

The present invention provides a capacitor-free leaky integrator. Integration is performed using nonlinear resistance supplied by triode-region-biased PMOS transistors operated near the weak inversion region. A large time constant can be obtained using a low-gain non-inverting amplifier to make use of the parasitic capacitance of the transistors.

The Circuit

Figure 1:
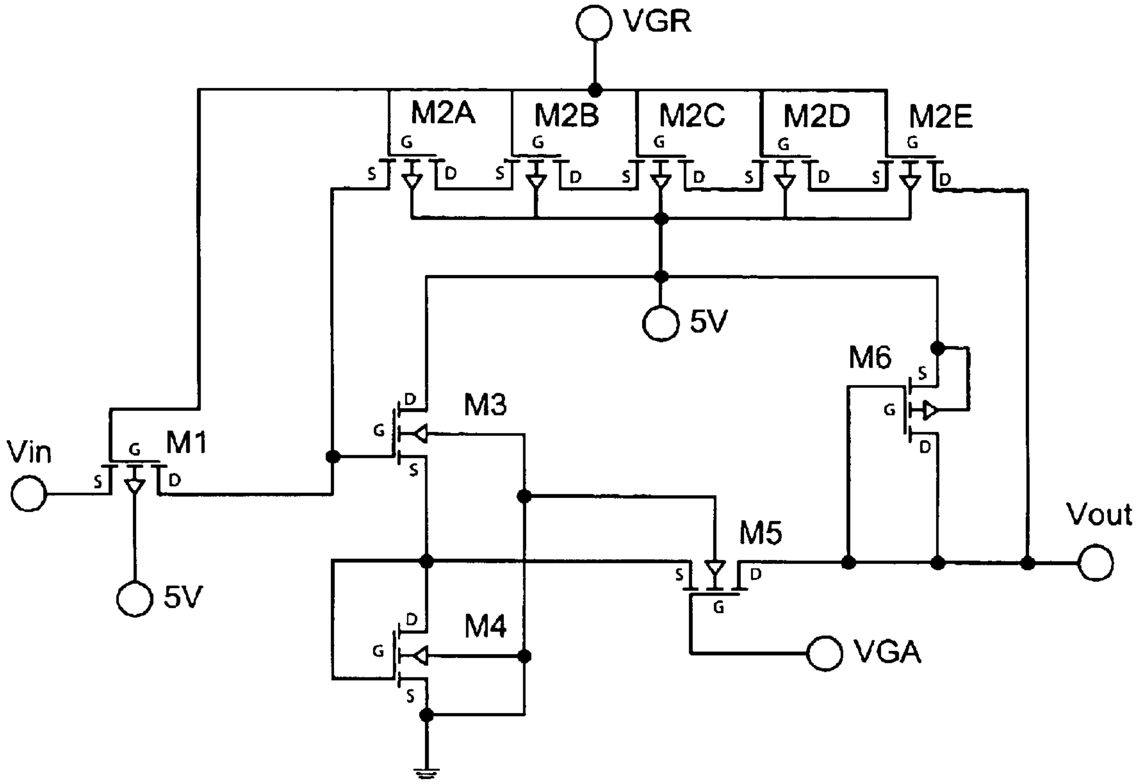
FIG. 1 is a circuit diagram of a capacitor-free leaky integrator circuit according to an embodiment of the present invention.

The invented leaky integrator circuit is shown in FIG. 1. PMOS (Positive-channel Metal Oxide Silicone) transistors M1 and M2A–M2E provide the nonlinear resistance. The abbreviations G, S, and D stand for gate, source, and drain respectively. M1 and M2A–M2E are referred to as "delay resistors" since it is the parasitic capacitance and RC time constants due to these components that effects the circuit's integration response characteristics. Each of these components can have identical geometry with width-to-length (W/L) ratios of one to one (1:1). It is expected that the size of each transistor M1 and M2A–M2E will be 3 $\mu$m/3 $\mu$m or $9^2$ $\mu$m. For ease of reference purposes only, M2A can be referred to as a starting transistor, M2B–M2D can be referred to as intermediate transistors, and M2E can be referred to as a terminating transistor.

In an alternate embodiment PMOS transistors M2A–M2E can be replaced with a single larger PMOS transistor having a W/L ratio of 1:5 (3 $\mu$m/15 $\mu$m). This results in a less "complicated" circuit. However, using five smaller PMOS transistors allows the circuit area filled by the leaky integrator to be minimized while assisting in parameter matching during circuit fabrication.

NMOS (Negative-channel Metal Oxide Silicone) transistors M3–M5 and PMOS transistor M6 comprise a common-gate amplifier that utilizes the parasitic capacitance of M1 and M2A–M2E to provide differing time constants for the rising and falling edges of an output signal produced in response to a pulsed input signal. The amplifier is designed to have a nominal small signal gain of 2.5 V/V for positive-going input signals at the quiescent bias point (Q-point). M3, M4, and M5 have W/L ratios of 4:1 (20 $\mu$m/5 $\mu$m), 10:1 (50 $\mu$m/5 $\mu$m), and 10:1 (50 $\mu$m/5 $\mu$m) respectively. Q-point drain current for M5 is 68 nA, of which 51 nA is drawn through M2, when $V_{GR}$ is 1.0 volts and $V_{GA}$ is 2.2 volts. Under these conditions the Q-point output voltage, Vout, is 2 volts for $V_{IN}$ equals 2.6 volts. PMOS load device M6 has W/L ratio of 4:5 (4 $\mu$m/5 $\mu$m).

One component of FIG. 1 can be said to be tied to another component of FIG. 1 if a conductive path is maintained between the two components. For example, the source of M1 is tied to the gate of M3 and the source of M2A. However, the conductive path that ties two components together need not be free of other components.

Pulse Response

Figure 2:
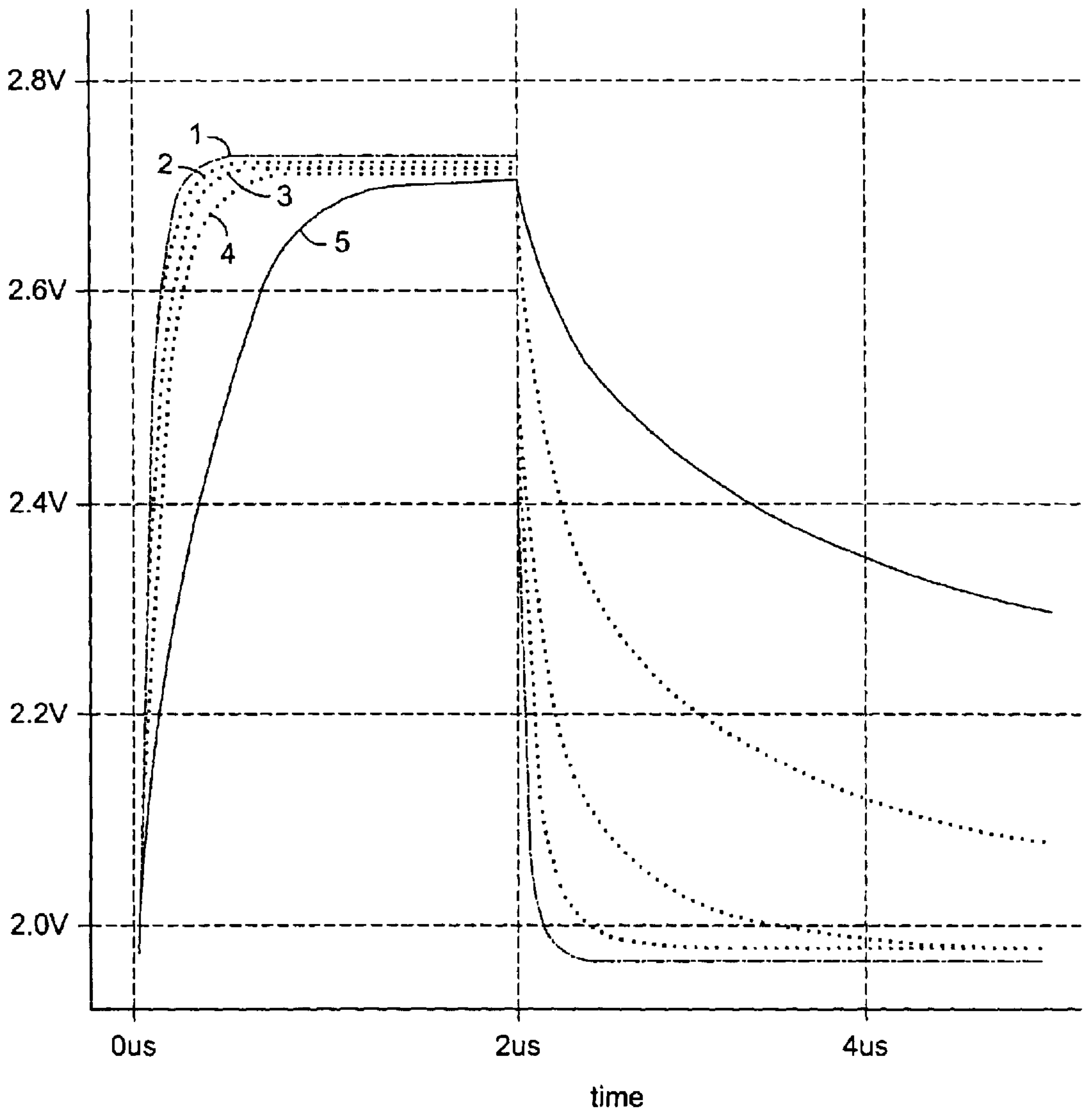
FIG. 2 is a graph illustrating pulse response as a function of delay-resistor gate bias of the circuit shown in FIG. 1.

Dynamic response of this circuit is a function of the delay-resistor bias $V_{GR}$ and the input signal level $V_{IN}$. Our input Q-point design is 2.6 volts. FIG. 2 shows the response of the circuit as a function of $V_{GR}$ to a 0.25 volt input pulse over a range of $V_{GR}$ from 1.0 to 1.4 volts in 0.1 volt increments. The slowest response is obtained for $V_{GR}$=1.4 volts and speeds up as $V_{GR}$ is decreased. The 0.25 volt input pulse is measured peak to peak and is relative to the Q-point.

This response is qualitatively easy to understand. The delay resistor M2 time constant, T, goes approximately as $$T = \frac{2L^2}{\mu[2(V_{SG} - V_T) - V_{SD}]}$$

where $V_{SG}$ is the source-to-gate voltage, $V_T$ is the threshold voltage, $V_{SD}$ is the source-to-drain voltage and $\mu$ is the carrier mobility. In response to a positive-going input, $V_{SG}$ increases whereas the use of multiple transistors M2A–M2E keeps $V_{SD}$ from matching this increase despite the gain of the amplifier. This accounts for the relatively rapid rising edge of the circuit response. On the failing edge, however, we have decreasing $V_{SG}$ and consequently an increasing T on the falling edge. At higher $V_{GR}$ settings the M2A–M2E transistors leave the strong inversion region resulting in a very low conductance at the Q-point.

The circuit response is a function of input signal level. FIG. 3 illustrates the response of the circuit to input pulses of 0.1 through 0.35 volts in 50 mV steps where $V_{GR}$=1.3 volts. Slower responses are obtained for the lower-level input signals. Rise time response decreases up to an input of 0.25 volts. The anomalous rise time response for 0.30 volts is due to a nonlinear transfer characteristic of the amplifier and is caused by the $V_{SG}$ of M5 leaving the strong inversion region. The apparent decrease in rise time response for 0.35 volts input is due to M5 becoming cut off. Note that the fall time response initially decreases at higher input signal levels but then slows down as the output returns to its Q-point. This behavior is consistent with that of biological neurons.

Figure 4:
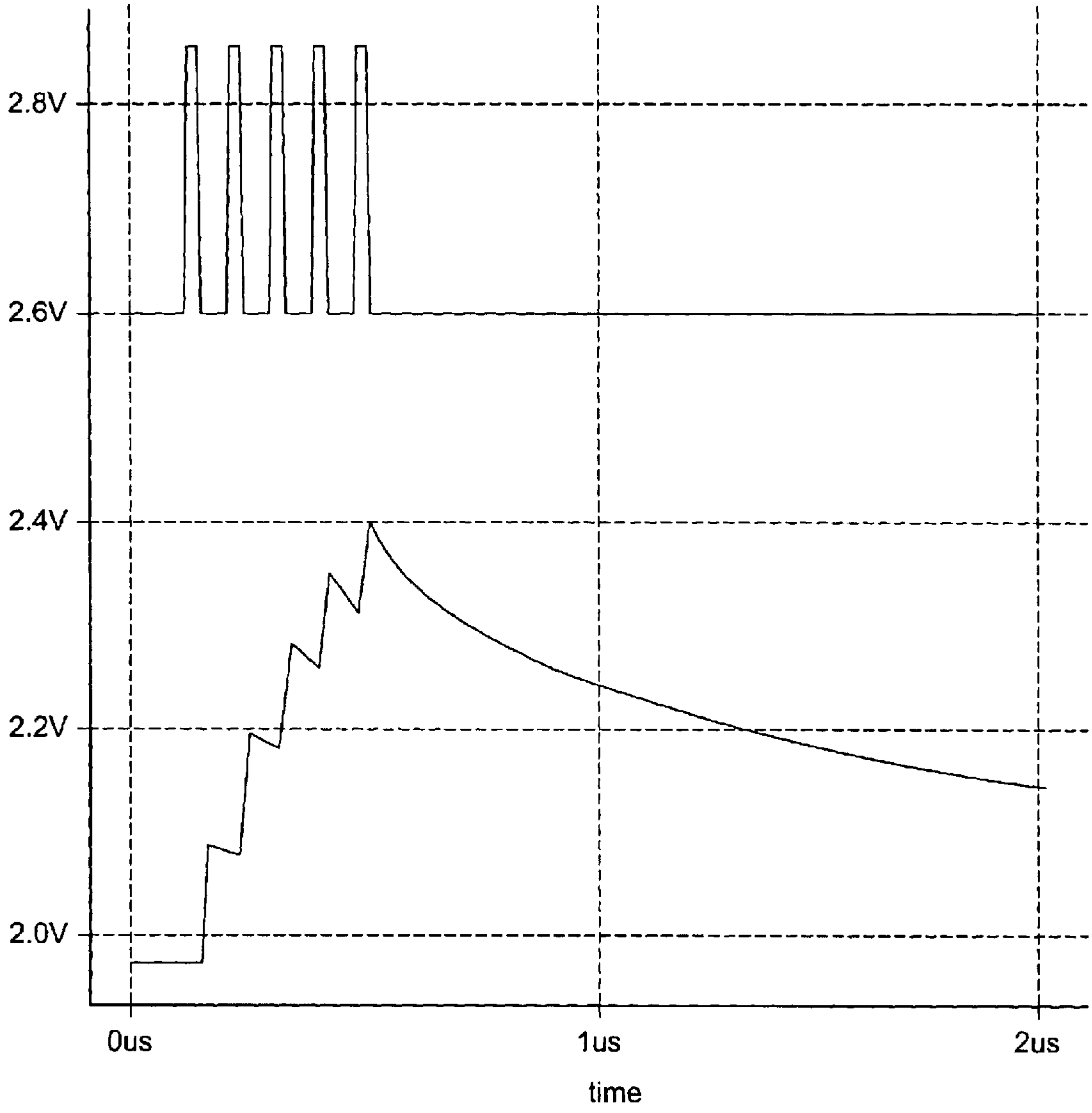
FIG. 4 is a graph illustrating the integration response of the circuit shown in FIG. 1.

The circuit's behavior as an integrator is illustrated in FIG. 4. The input signal consists of 5 equally-spaced 0.25 volt pulses with 10 nanosecond rise and fall times and a total width of 40 nanoseconds. $V_{GR}$ was set at 1.3 volts. Of note is the rapid integration of the pulse inputs and the slow decay of the response tail at the cessation of the input. Also worthy of note is the fact that the tail's decay takes place over an interval of a few microseconds despite the absence of any explicitly-integrated capacitors in the circuit.

Conclusion

These results demonstrate that passive integrated capacitor components are not necessary in pulse-mode artificial neurons. The effect they are intended to model—namely, the integration of voltage in the neural membrane—can be obtained from one or more transistors. Moreover, the integrator's time constant can be adapted to better mimic biological neurons.

The present invention has been shown and described with reference to the foregoing exemplary embodiments. It is to be understood, however, that other forms, details, and embodiments may be made without departing from the spirit and scope of the invention that is defined in the following claims.

What is claimed is:

1. A leaky integrator, comprising:

a capacitor-free non-linear delay resistor having a parasitic capacitance; and a capacitor-free amplifier operable to utilize the parasitic capacitance of the delay resistor to provide differing time constants for the rising and falling edges of an output signal produced in response to a pulsed input signal;

wherein the delay resistor includes a first transistor and a plurality of second transistors, the first transistor having a source that defines an input for the leaky integrator, a gate tied to a voltage source, and a drain tied to the amplifier;

wherein the second transistors include a starting transistor, a terminating transistor, and a plurality of intermediate transistors, each of the second transistors having a source, a drain, and a gate, and wherein:

the gates of each of the second transistors are tied to the voltage source;

the source of the starting transistor is tied to the drain of the first transistor;

the drain of the terminating transistor defines an output of the delay resistor;

the source of the terminating transistor is tied to the drain of one intermediate transistors; and the source of all but one intermediate transistor is tied to either the drain of another intermediate transistor while the source of the remaining intermediate transistor is tied to the drain of the starting transistor.

2. The leaky integrator of claim 1, wherein the starting, intermediate, and terminating transistors are positive channel metal oxide silicone transistors.

3. The leaky integrator of claim 1, wherein the first and second transistors each have a width to length ratio of about 1:1.

4. The leaky integrator of claim 3, wherein the first and second transistors each have a size of about nine square micro meters.

5. The leaky integrator of claim 1, wherein the amplifier is a non inverting common gate amplifier with an input tied to the drain of the first transistor and an amplifier output tied to the drain of the terminating transistor.

6. A leaky integrator, comprising:

a capacitor-free non-linear delay resistor having a parasitic capacitance; and a capacitor-free amplifier tied to the delay resistor wherein the amplifier utilizes the parasitic capacitance of the delay resistor to provide differing time constants for the rising and falling edges of an output signal produced in response to a pulsed input signal;

wherein the amplifier comprises third, fourth, fifth, and sixth transistors each having a source, a drain, and a gate, wherein:

for the third transistor, the gate is tied to the non-linear delay resistor;

for the fourth transistor, the gate and the drain are tied to the source of the third transistor;

for the fifth transistor, the gate is tied to a second voltage source, and the source is tied to drain of the fourth transistor; and for the sixth transistor, the drain and the gate are tied to the drain of the fifth transistor and to the non-linear delay resistor, and the source is tied to a power supply.

7. The leaky integrator of claim 6, wherein the third, fourth, and fifth transistors are negative channel metal oxide silicone transistors and wherein the sixth transistor is a positive channel metal oxide silicone transistor.

8. The leaky integrator of claim 6, wherein:

the third transistor has a width to length ratio of about 4:1;

the fourth and fifth transistors have width to length ratios of about 10:1; and the sixth transistor has a width to length ratio of about 4:5.

9. The leaky integrator of claim 8, wherein:

the third transistor has a size of about one hundred square micrometers;

the fourth and fifth transistors each have a size of about two hundred fifty square micrometers; and the sixth transistor has a size of about twenty square micrometers.

10. A leaky integrator, comprising:

a non-linear delay resistor having a parasitic capacitance, the delay resistor including first and one or more second transistors each having a source, a drain, and a gate;

an amplifier operable to utilize the parasitic capacitance of the delay resistor to provide differing time constants for the rising and falling edges of an output signal produced in response to a pulsed input signal, the amplifier including third, fourth, fifth, and sixth transistors; and wherein:

for the first transistor:

the source defines an input for the leaky integrator; and the gate is tied to a first voltage source; for the one or more second transistors:

at least one source is tied to the drain of the first transistor;

at least one gate is tied to the first voltage source; and at least one drain defines an output of the leaky integrator; for the third transistor:

the gate is tied to drain of the first transistor; for the fourth-transistor:

the gate and the drain are tied to the source of the third transistor; for the fifth transistor:

the gate is tied to a second voltage source; and the source is tied to drain of the fourth transistor; and for the sixth transistor:

the drain and the gate are tied to the drain of the fifth transistor and to the drain of the second transistor; and the source is tied to a power supply.

11. The leaky integrator of claim 10, wherein the one or more second transistor comprise a starting transistor, a terminating transistor, and a plurality of intermediate transistors, each of the plurality of second transistors having a source, a drain, and a gate, and wherein:

the gates of each of the plurality of second transistors are tied to the first voltage source;

the source of the starting transistor is tied to the drain of the first transistor;

the drain of the terminating transistor defines the output of the leaky integrator;

the source of the terminating transistor is tied to the drain of one intermediate transistor; and the source of all but one intermediate transistor is tied to the drain of another intermediate transistor while the source of the remaining intermediate transistor is tied to the drain of the starting transistor.

* * * * *